(12) United States Patent
Santana

(10) Patent No.: US 11,557,911 B2
(45) Date of Patent: Jan. 17, 2023

(54) RECHARGING PAD HAVING WIRELESS CHARGING CAPABILITIES AND MODULAR RECHARGING COMPARTMENTS

(71) Applicant: Daniel Santana, Tampa, FL (US)

(72) Inventor: Daniel Santana, Tampa, FL (US)

(*) Notice: Subject to any disclaimer, the term of this patent is extended or adjusted under 35 U.S.C. 154(b) by 541 days.

(21) Appl. No.: 16/416,094

(22) Filed: May 17, 2019

(65) Prior Publication Data

US 2020/0366119 A1 Nov. 19, 2020

(51) Int. Cl.
| | |
|---|---|
| H02J 7/02 | (2016.01) |
| H02J 50/10 | (2016.01) |
| H02J 7/00 | (2006.01) |
| H02J 50/40 | (2016.01) |
| H02J 50/00 | (2016.01) |
| H02J 50/12 | (2016.01) |

(52) U.S. Cl.
CPC ............ *H02J 7/025* (2013.01); *H02J 7/0045* (2013.01); *H02J 50/10* (2016.02); *H02J 50/402* (2020.01); *H02J 7/00* (2013.01); *H02J 50/00* (2016.02); *H02J 50/005* (2020.01); *H02J 50/12* (2016.02)

(58) Field of Classification Search
CPC ........ H02J 50/10; H02J 7/0045; H02J 50/005; H02J 50/00; H02J 7/00; H02J 50/12; H02J 50/402; H02J 50/40
See application file for complete search history.

(56) References Cited

U.S. PATENT DOCUMENTS

| | | | |
|---|---|---|---|
| 9,124,105 B2 | 9/2015 | Gunderman | |
| 9,472,963 B2 | 10/2016 | Van Wiemeersch | |
| 9,543,780 B2 | 1/2017 | Ho | |
| 9,667,092 B2 | 5/2017 | Miller | |
| 10,224,753 B2 | 3/2019 | Von Novak | |
| 2011/0227527 A1* | 9/2011 | Zhu | H02J 7/0044 320/108 |
| 2011/0241608 A1* | 10/2011 | Adamczyk | H02J 7/0013 320/108 |
| 2014/0366816 A1* | 12/2014 | Platt | F01P 3/18 137/340 |
| 2014/0368163 A1* | 12/2014 | Ho | H02J 50/40 320/108 |
| 2016/0072340 A1 | 3/2016 | Yoon | |
| 2016/0271612 A1* | 9/2016 | Masoumi | C12M 23/50 |
| 2017/0117738 A1 | 4/2017 | Yeoh | |
| 2017/0338859 A1 | 11/2017 | Figgers | |
| 2019/0237986 A1* | 8/2019 | Agarwal | H02J 50/10 |

* cited by examiner

*Primary Examiner* — Stacy Whitmore
(74) *Attorney, Agent, or Firm* — Boudwin Intellectual Property; Daniel Boudwin

(57) ABSTRACT

A pad for wirelessly charging wireless products selected from the group consisting of wireless hair clippers, wireless air compressors, wireless hair curling iron, wireless hair styles, wireless hair trimmer, wireless hair dryer, wireless hair massager, wireless hair straightener, wireless hair brush, wireless razor, wireless hot hair brush, wireless nose trimmer, wherein said pad includes permanent charging ports and temporary charging ports, said permanent charging ports having charging coils embedded in the pad, said temporary charging ports inserted with wireless charging modules to provide wireless charging capability. The size, number and orientation of the permanent and temporary charging ports can vary depending on the users's need.

1 Claim, 4 Drawing Sheets

RECHARGING PAD HAVING WIRELESS CHARGING CAPABILITIES AND MODULAR RECHARGING COMPARTMENTS

BACKGROUND

The typical wireless charger today comes with a single port or more than one port. The challenge is to create a wireless charger that can be scaled to have several ports available for charging multiple devices simultaneously by using electromagnetic induction technology.

The present invention provides a pad for providing wireless charging capability and scaling the wireless charging capability of the wireless charging pad. Once a user purchases additional devices that require wireless charging, a purchase of modular charger modules inserted into modular non-charging ports allows the charging pad to have increased capacity for charging more wireless devices.

This scalable approach has several benefits to the users. With a lower financial barrier of entry, a user may purchase a wireless charging pad with as few as two wireless charging ports. The practical integration of additional wireless charging ports allows the consumer to grow the capability (specifically the number of ports) available to them.

DETAILED DESCRIPTION OF DRAWINGS

DETAILED DESCRIPTION

As used herein, "wireless charging" or "wireless charger" refers to the ability to induce a charge on a nearby object, including via physical connection, without requiring the use of wires connecting between the transmitting object and the receiver object.

Figure 1:
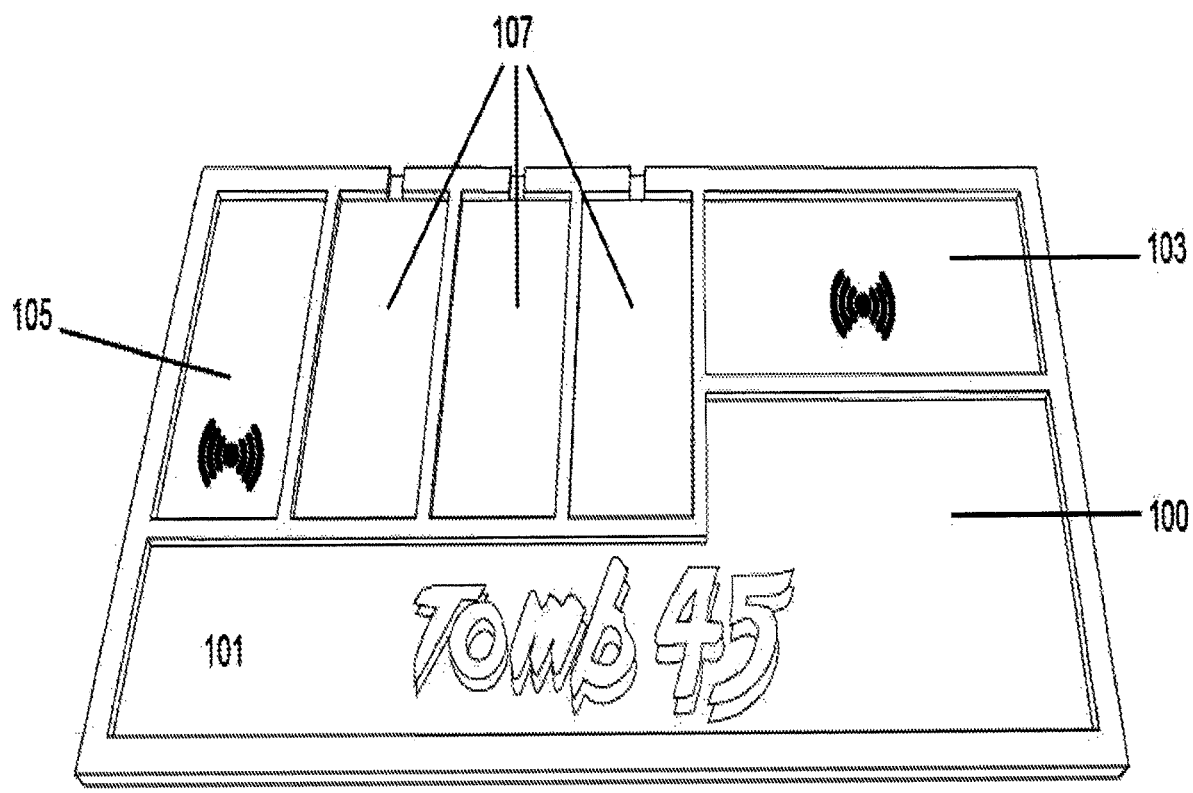
FIG. 1 is an embodiment of the present invention.

Now with reference to the figures,

FIG. 1 of the present invention is an embodiment of a wireless charging pad 100. The charging pad 100 recharges wireless charging devices through the use of AC power. The wireless charging pad 100 as a single unit.

The wireless charging pad 100 comprises a plurality of wireless charging ports 103, 105, 107, whereby the charging ports 103 and 105 can be permanent charging ports, and certain ports 107 can be modular non-charging ports used for non-charging storage and for inserting a modular charger to enable wireless charging capability. For permanent charging ports 103 and 105, the charging induction coils (not shown) are embedded below the pad surface. Permanent ports can be beneficial as users have starting charger points without requiring the need for a modular charger initially. For the modular non-charging ports 107, additional modular charger is needed to be inserted into the modular non-charging ports 107 to provide wireless charging capability. The permanent charging ports are designed to provide the wireless charging capability with charging induction coils inside. The pad 100 can also have extra non-charging storage space 101 Each of the wireless charging ports includes a charging surface which is structured and configured to wirelessly charge an electronic device. Each of the wireless charging ports 103, 105, 107 is separated by grooved edges with a height of 0.5-1 cm. The height of the groove edge can vary depending on the thickness of the pad 100. In a preferred embodiment, the height of the groove edge is less than 3 cm.

Each of the wireless charging ports 103, 105, 107 can be in any customized shape, size, and orientation. And the number of wireless charging ports 103, 105, 107 can vary depending on users' need. In one embodiment, the wireless charging pad has 2 permanent wireless charging ports and 3 temporary wireless charging ports. In another embodiment, the wireless charging pad has 3-5 permanent wireless charging ports and 2-7 temporary wireless charging ports. In another embodiment, the wireless charging pad 100 has 5 ports 103, 105, 107, among them ports 105, 107 are rectangular parallel to each other wherein ports 107 having 3 same ports, port 103 is rectangular next to ports 107 but perpendicular to ports 107, port 101 is the rest region of the pad 100.

Figure 2:
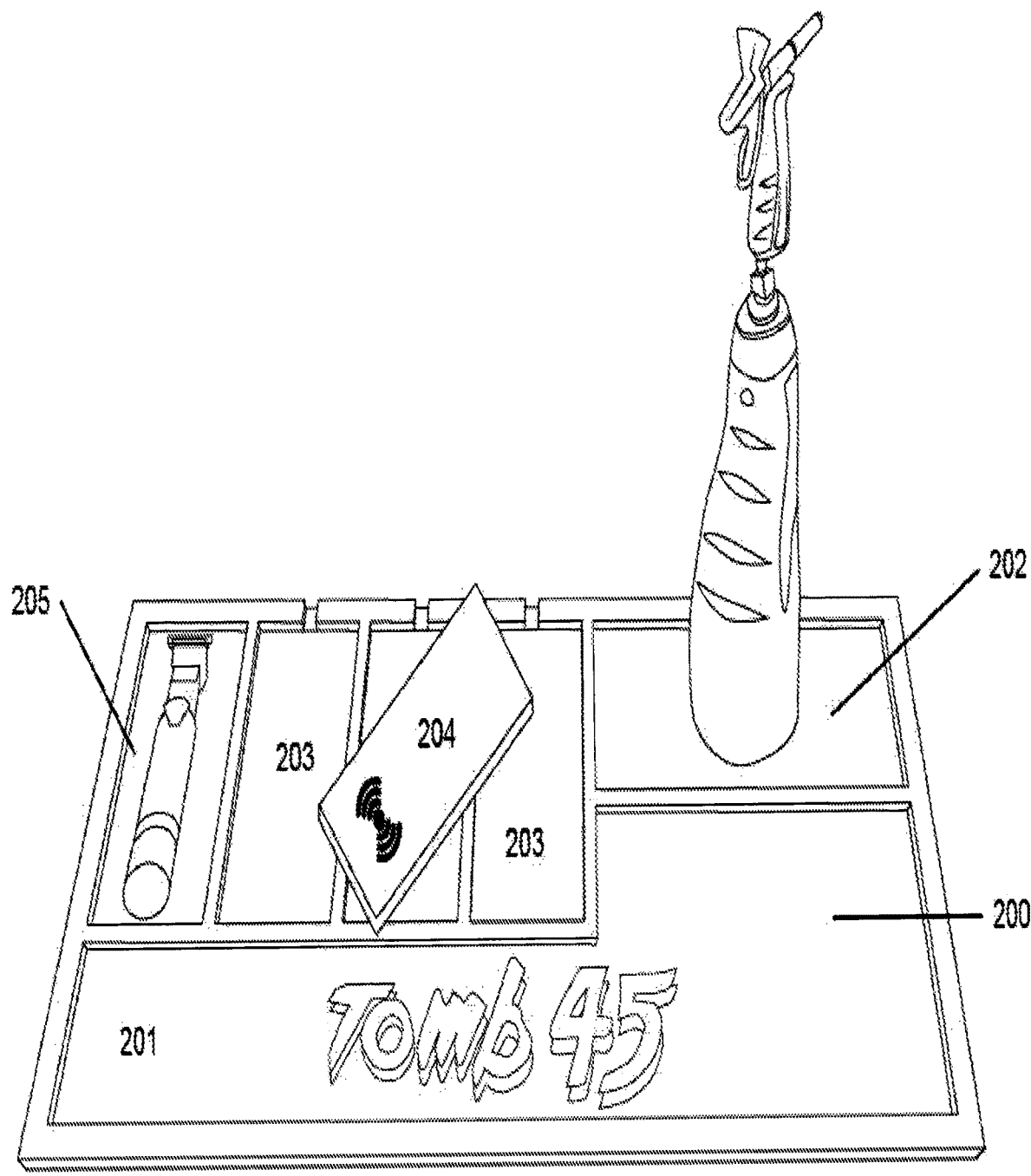
FIG. 2 is an embodiment of the present invention with wireless charging devices placed in the permanent charging ports and a wireless charging module laid in the temporary charging ports regions.

FIG. 2 is an embodiment of the present invention, a wireless charging pad 200 with charging devices thereon. The wireless charging pad 200 is generally planar and supports wireless charging devices thereon. As discussed previously, ports 202 and 205 are permanent charging ports, ports 203 are modular ports and non-charging storage region 201. Each wireless charging port is designed to recharge one device. In one embodiment, a wireless charging electric clipper is placed in port 205 and a wireless charging air compressor is placed in port 202. The wireless charging devices are either commercially available or are modified to have the wireless charging capability. A modular charger 204 is placed in the modular ports 203. The modular charger 204 is a single unit, providing wireless charging capability once connected to the AC power. In a preferred embodiment, the modular charger 204 is placed into a modular port 203. When the devices having wireless capability are placed in the modular port 203 having the modular charger 204 therein, the devices automatically start charging. Thus, multiple wireless charging devices can be placed on the pad and charge simultaneously.

Figure 3:
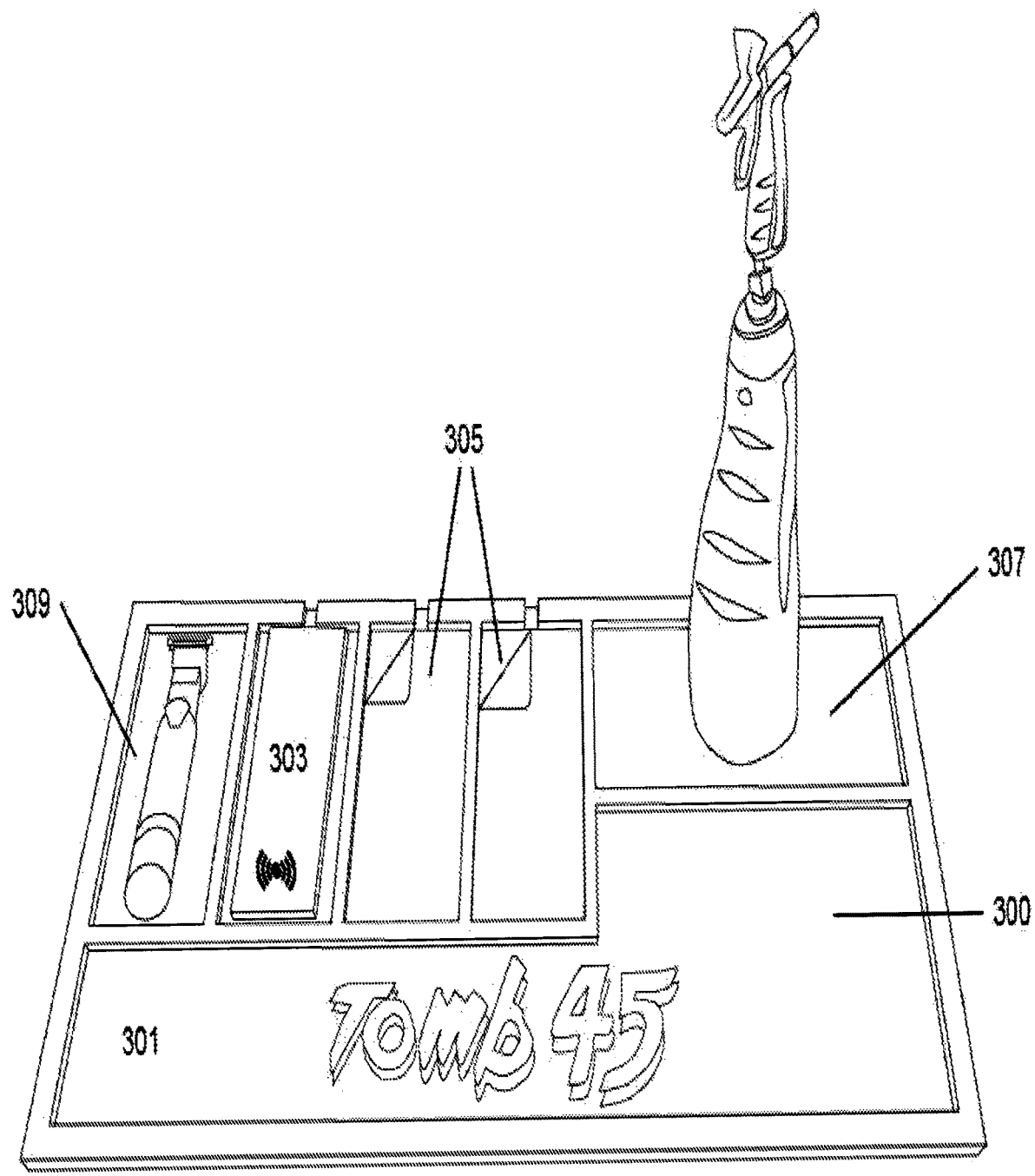
FIG. 3 is an embodiment of the present invention with wireless charging devices placed in the permanent charging ports and a wireless charging module placed in one of the temporary charging ports.

FIG. 3 is an embodiment of the present invention, a wireless charging pad 300 with charging devices thereon. The wireless charging pad 300 has ports 307 and 309 as permanent charging ports, ports 303 and 305 as modular ports and the region 301 used for organizing items. Each wireless charging port is designed to recharge one device. In one embodiment, a wireless charging electric clipper is placed in port 309 and a wireless charging air compressor is placed in port 307. The wireless charging devices are either commercially available or are modified to have the wireless charging capability. A modular charger 303 is placed in one of the modular ports. Two extra wireless charging ports 305 are available for inserting wireless charging modules. The benefit of the modular charger is that it facilitates wireless charging by scaling with multiple wireless charging ports. The modular charger allow increasing the number of available wireless charging ports. The users will have more options to choose when purchasing the wireless charging pad. For example, the users can purchase the initial product at a lower price point and purchase additional wireless charging modules to increase the number of available wireless charging ports.

Figure 4:
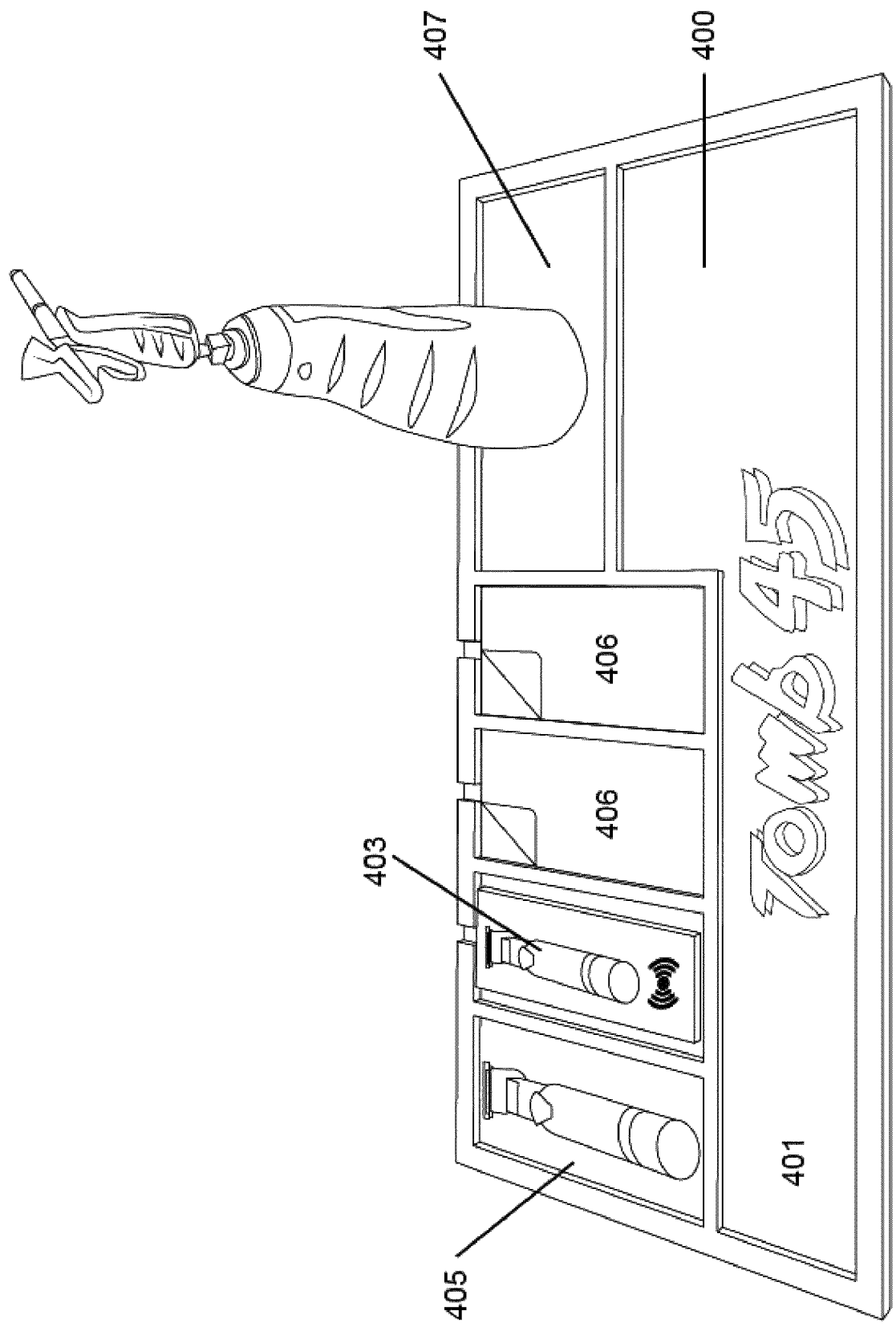
FIG. 4 is an embodiment of the present invention with wireless charging devices placed in the permanent charging ports and a wireless charging module placed in one of the temporary charging ports with a wireless charging device on it.

FIG. 4 is an embodiment of the present invention, a wireless charging pad 400 with charging devices thereon. The wireless charging pad 400 has ports 405 and 407 as permanent charging ports, ports 406 as modular ports and the region 401 used for organizing items. The port where the electric clipper 403 is placed is also a modular port enabled by inserting a modular charger. Once a modular port is inserted in a modular port, it works as a wireless charger and items can be placed on for wireless charging. In one embodiment, a clipper 403 is placed into a modular charger enabled modular port for wireless charging. In one embodiment, a wireless charging electric clipper is placed in port 405 and a wireless charging air compressor is placed in port 407. The wireless charging devices are either commercially available or are modified to have the wireless charging capability. The wireless charging devices are not limited to clippers and air compressors, they can be any type of wireless charging devices, such as wireless curling iron, wireless hair styler, wireless hair trimmer, wireless hair dryer, wireless hair massager, wireless hair straightener, wireless hairbrush, wireless razor, wireless hot hairbrush, wireless nose trimmer. The wireless charging mat can also charge phones, watches, and other electronic devices. The wireless charging devices are either commercially available or are modified to be capable of wireless charging.

I claim:

1. A pad for wirelessly charging wireless products, comprising:
   a base;
   a first group of compartments disposed on the base, wherein each compartment of the first group of compartments comprises an embedded wireless induction charging device;
   a second group of compartments disposed on the base, wherein each compartment of the second group of compartments configured to receive a corresponding connector of an external wireless induction charging device;
   a third group of compartments disposed on the base, wherein each compartment of the third group of compartments is configured for organizing items;
   wherein each individual compartment of the first group, second group, and third group of compartments is separated from an adjacent compartment via a raised edge extending upwardly from the base;
   wherein each compartment of the second group of compartments includes a slot disposed on at least one raised edge.

* * * * *